United States Patent [19]

Dyer

[11] Patent Number: 4,863,254
[45] Date of Patent: Sep. 5, 1989

[54] SIDE VIEW MIRROR ATTACHMENT

[76] Inventor: William B. Dyer, 3358 Taylor Rd., Central Point, Oreg. 97502

[21] Appl. No.: 179,765

[22] Filed: Apr. 11, 1988

[51] Int. Cl.⁴ .............................................. G02B 5/08
[52] U.S. Cl. .................................... 350/631; 350/612
[58] Field of Search .............. 350/612, 625, 626, 606, 350/631, 632

[56] References Cited

U.S. PATENT DOCUMENTS 3,954,328  5/1976  Ames .................................... 350/626
4,598,982  7/1986  Levine .................................. 350/626

FOREIGN PATENT DOCUMENTS 1202646  12/1971  United Kingdom ................ 350/631

Primary Examiner—Bruce Y. Arnold
Assistant Examiner—J. P. Ryan
Attorney, Agent, or Firm—James D. Givnan, Jr.

[57] ABSTRACT

An auxiliary mirror having a base with perpendicular members for abutment with a vehicle mirror housing. An extension on one of the members carries the auxiliary mirror. Elastic straps with hook elements secure the base to the mirror housing. The base is shaped to abut the mirror housing perimeter.

4 Claims, 1 Drawing Sheet

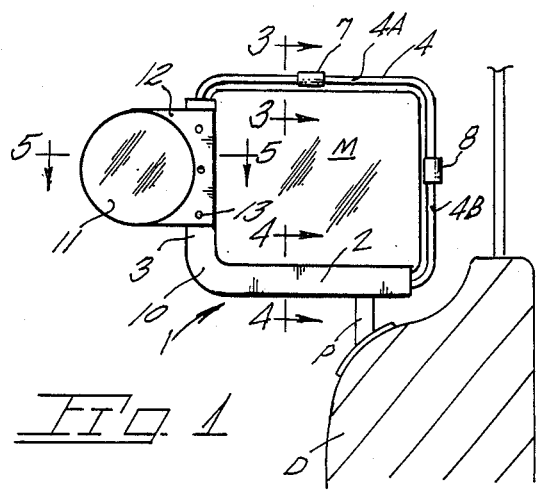
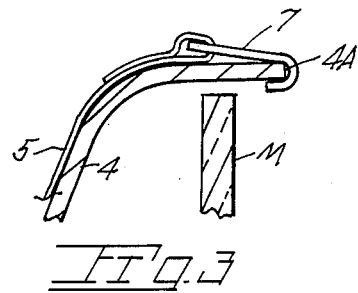
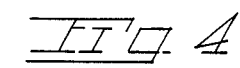
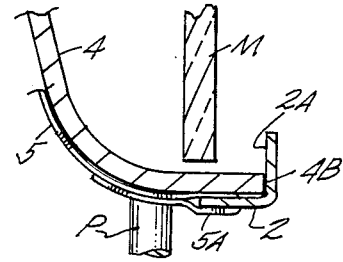
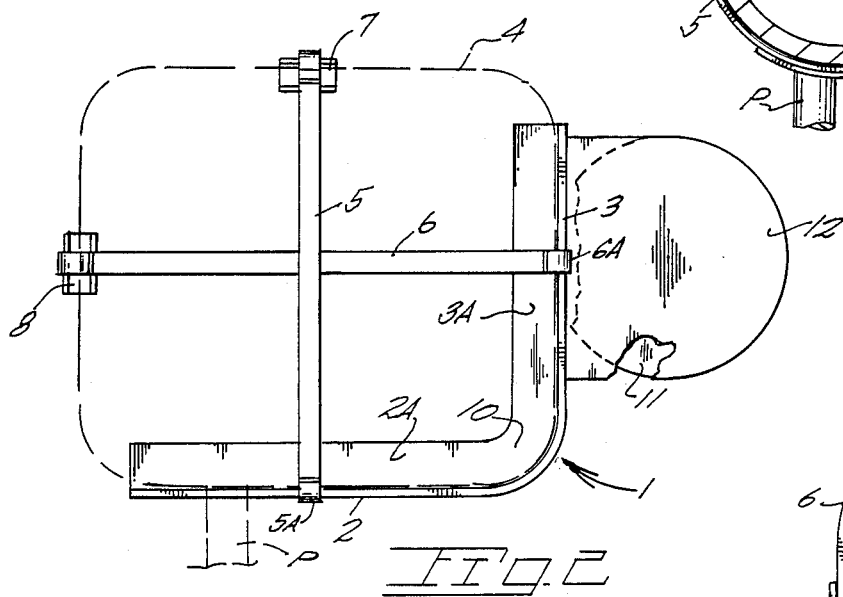
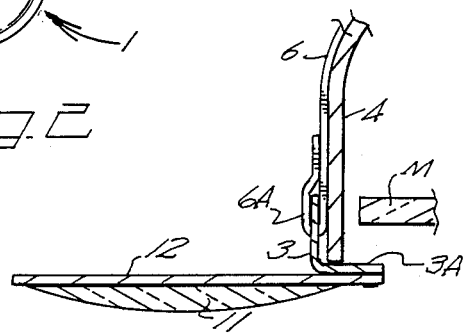

SIDE VIEW MIRROR ATTACHMENT

BACKGROUND OF THE INVENTION

The present invention pertains generally to automotive mirrors which supplement the range of view of vehicle original equipment mirrors.

Automobile side view mirrors, normally located proximate the forward edge of the vehicles front doors, provide a range of view rearwardly to the sides of the vehicle and to some extent rearwardly of the vehicle proper. Side view mirrors do not provide a large viewing range laterally of the vehicle and, accordingly, a blind spot exists to the side and somewhat rearwardly of the vehicle driver. Efforts to increase the viewing field of side view mirrors have resulted in the use of mirrors supported at distances from the vehicle by tubular arms with such mirrors most commonly used when towing a wide load which hinders original equipment side view mirror use. Examples of side view mirrors intended for use when towing wide loads are found in U.S. Pat. Nos. 3,166,197 and 4,664,489. The side view mirrors disclosed in U.S. Pat. Nos. 4,208,104 and 4,025,173 are intended to increase the field of view to the side of a vehicle but are not mirror attachments and are not compatible with factory installed mirrors.

SUMMARY OF THE PRESENT INVENTION

The present invention is embodied within an auxiliary side view mirror for temporary installation on an existing side view mirror to greatly increase the operator's reflected range of view to the side of the vehicle.

A base member of the present attachment is configured for secure engagement with the housing of the vehicle side view mirror regardless of variances between side view mirror shapes. The base member includes perpendicularly disposed surfaces for abutment with the side view mirror housing with tensionable straps passing over the housing and terminating in hooked engagement therewith. An extension on the base member carries a mirror, preferably convex, to greatly enhance the driver's field of view to the side and rear of a vehicle. The tensionable members permit convenient mounting and dismounting of the present mirror attachment.

Important objectives include the provision of a side view mirror attachment which virtually overcomes the blind spot located at the side and extending somewhat rearward of the vehicle; the provision of a side view mirror attachment which permits convenient and secure installation on an existing side view mirror without damage to the mirror housing; the provision of an auxiliary side view mirror having upright and horizontal base components to enable attachment to a wide range of mirror housing sizes and shapes.

BRIEF DESCRIPTION OF THE DRAWINGS

In the accompanying drawings:

FIG. 1 is an elevational view of a typical vehicle side view mirror with the present mirror attachment in place;

FIG. 2 is an elevational view of the side view mirror attachment with the vehicle side view mirror shown in phantom lines;

FIGS. 3 and 4 are vertical sectional views taken along lines 3—3, 4—4 of FIG. 1; and FIG. 5 is a view similar to FIG. 1 showing the attachment on a mirror housing of different shape.

DETAILED DESCRIPTION OF THE PREFERRED EMBODIMENTS

With continuing attention to the drawings wherein applied reference numerals indicate parts similarly hereinafter identified, the reference numeral 1 includes generally a base of the present attachment.

The base includes horizontal and vertical members at 2 and 3 both adapted to abut the mirror frame or housing at 4 enclosing an original equipment mirror M. A post P supports the mirror frame on an auto door D or in some instances an auto or truck fender.

Base members 2 and 3 have surfaces at 2A and 3A which abut a perimetrical edge or lip of mirror housing 4. Elastic straps at 5 and 6 are permanently attached at one end of their ends as at 5A and 6A to one each of said base members while their remaining ends are provided with hook elements at 7 and 8 for tensioned mirror engagement with a mirror housing lip 4A–4B. The horizontal and vertical members may be embodied in a single unitary structure such as one of angle section having a curved segment at 10.

An auxiliary mirror at 11 is preferably of convex shape to provide a wide range of reflected view to supplement the conventional mirror at M. The mirror 11 is carried on an extension 12 extending laterally from and suitably secured to vertical member 3 of base 1 as by rivets at 13.

The hook elements 7 and 8 may be coated with rubber or a soft plastic to prevent marring of the mirror housing.

It will be understood that while base members 2 and 3 are shown as being straight, one or both may be curved to best achieve attachment to vehicle mirror housing 4.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A mirror for attachment to the side view mirror housing of a vehicle and comprising in combination, a base having substantially perpendicular upright and horizontal members of angle section for engagement with the vehicle side view mirror housing, said members each having surfaces normal to one another for abutment with the exterior of the mirror housing, a lateral extension on the upright member, a mirror on said extension, and tensionable means carried by said base having a free end for hooked engagement with said side view mirror housing to hold said base in place on the side view mirror in a detachable manner.

2. A rear view mirror for attachment to the side view mirror as claimed in claim 1 wherein said tensionable means are elastic straps carried one each by said members and are equipped with hooks.

3. An attachment for a side view mirror housing of a vehicle, said housing having a forwardly directed lip, said attachment comprising in combination, a base including an upright base member and a horizontal base member each of angle section for abutment with the side view mirror, said upright base member and said horizontal base member being continuous, a lateral extension fixed in place on said upright member, a mirror on said extension for supplementing the range of view provided by the vehicle side view mirror, and elastic means carried by said base including hooks for biased engagement with a lip of the side view mirror.

4. A side view mirror housing attachment comprising in combination, a base having perpendicularly orientated member of angle section, a lateral extension on one of said members, an auxiliary mirror on said extension, straps carried by said members and each provided with a hook element for securing said base to the side view mirror housing, said members having surfaces adapted for abutment with said side view mirror housing, and said straps being of an elastic nature to urge said members into abutment with the side view mirror housing to retain said auxiliary mirror adjacent said housing.

* * * * *